Oct. 5, 1926.
B. FIERRO
TIRE LOCK
Filed Nov. 11, 1925
1,601,816
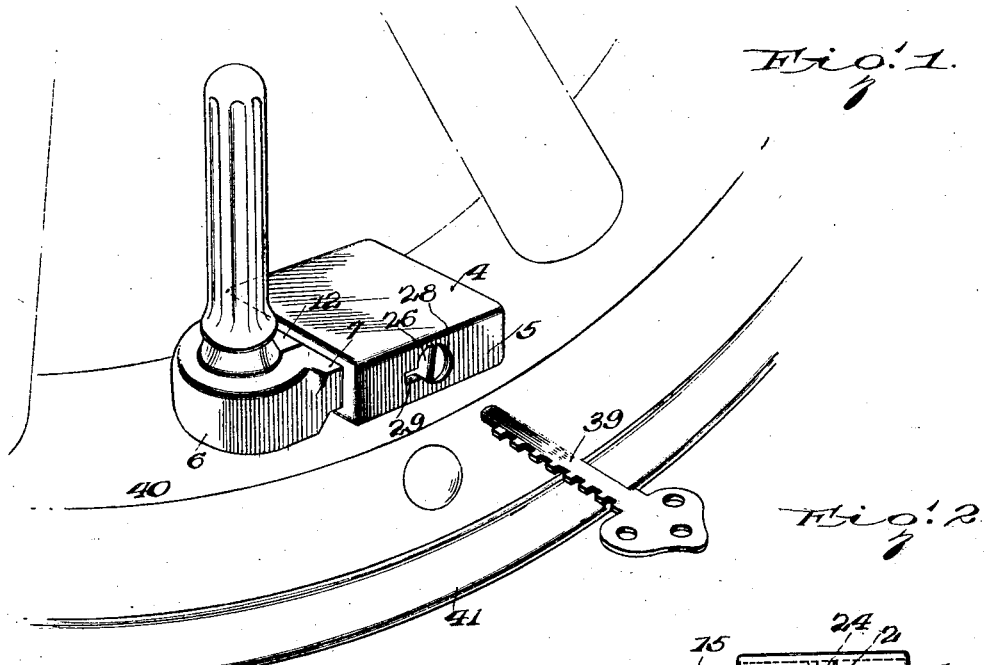
Fig. 1.
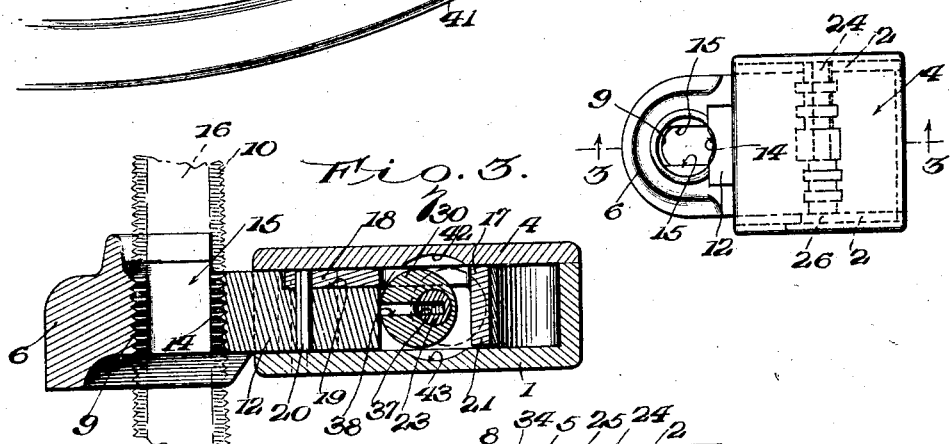
Fig. 2.
Fig. 3.
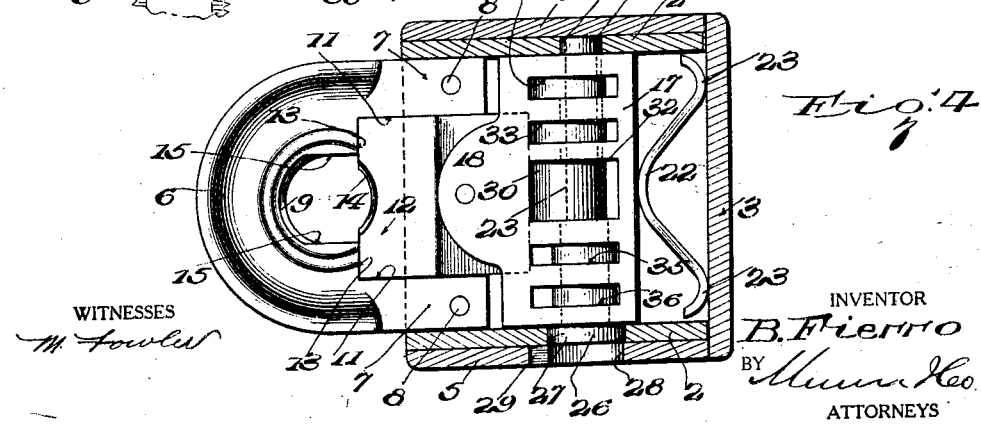
Fig. 4.
WITNESSES
M. Fowler
INVENTOR
B. Fierro
BY
ATTORNEYS Patented Oct. 5, 1926.

1,601,816

UNITED STATES PATENT OFFICE.

BELISARIO FIERRO, OF FORT BLISS, TEXAS.

TIRE LOCK.

Application filed November 11, 1925. Serial No. 68,351.

My invention relates to improvements in locking devices for preventing unauthorized removal of an automobile tire from a wheel rim of the automobile, and it consists in the combinations, constructions and arrangements herein described and claimed.

An object of the invention is the provision of a simple, reliable and efficient locking device which is adapted to be applied to the valve stem of a tire which has been mounted on an automobile wheel and which, when so applied, will prevent the unauthorized removal of the tire from the wheel.

A further object of the invention is the provision of a tire lock which embodies key controlled locking mechanism for engaging with an externally threaded tire valve stem or like tubular member so that the locking device cannot be displaced from the tire valve stem or like member until the locking mechanism has been actuated by the key as required to effect the release of the tire valve stem or like member from the locking mechanism.

A still further object of the invention is the provision of a tire lock of the character described which is compact in form and when applied to the valve stem of a tire which is mounted on an automobile wheel will be supported at the inner side of the rim of the wheel and will not interfere with the inflation or deflation of the tire or the use of the wheel in an ordinary manner.

Other objects and advantages of the invention will be apparent from the following description, considered in conjunction with the accompanying drawings, in which—

Figure 1 is a perspective view of the improved lock applied to the valve stem of a tire on an automobile wheel, only a portion of the automobile wheel and a like portion of the tire being shown, the key for the lock also being shown, Figure 2 is a plan view of the lock with certain parts thereof that are housed within the casing indicated by dash lines, Figure 3 is a relatively enlarged longitudinal vertical section through the lock, substantially along the line 3—3 of Figure 2, Figure 4 is a horizontal section through the lock casing, the remaining elements of the lock being shown in plan.

The casing of the lock comprises two telescopic sections, one of which may be termed the lower section and the other the top section. The lower section comprises a bottom 1 which is substantially rectangular in configuration and from which a pair of side members 2 and a back member 3 are upstanding. The top section of the lock case comprises a top member 4 which also is substantially rectangular in configuration and which has side members 5 depending from two opposite marginal edges thereof in position to straddle the side members 2 of the lower section of the lock case. The two sections of the lock case are secured together in any suitable known manner, as by welding, after the internal mechanism of the lock has been disposed within the casing and the casing thus produced will be open at its front end and will be closed at its top, bottom, sides and back.

A stationary lock member or shackle 6 is substantially U-shaped and has a pair of arms 7 which extend within the lock casing at the front of the latter and are secured to the bottom of the lock casing by rivets 8. The inner wall of the bight portion of the shackle is arcuately curved and is formed with screw threads 9 adapted to mesh with screw threads on a tire valve stem 10 of conventional construction. The arms of the shackle 6 have cut away portions 11 at their inner sides extending from the extremities of the arms of the shackle for part of their length, the inner walls of the cut away portions 11 of the arms of the shackle being parallel and cooperating with portions of the bottom and top walls of the latch casing to produce a passage way in which the head section 12 of a movable lock bolt may slide.

Shoulders 13 at the outer ends of the cut away portions 11 constitute stops for limiting the outward movement of the head section 12 of the lock bolt. This head section 12 of the moving lock bolt has a vertical depression or cut away portion in its outer or front face which curves arcuately and concavely transversely thereof and is formed with transverse ridges or threads, as indicated at 14, adapted to mesh with threads of the tire valve stem. The inner faces of the arms of the shackle may be flattened as indicated at 15 between the shoulders 13 and the ends of the threads 9 to have sliding contact with the opposite flattened portions 16 of the tire valve stem 10.

The movable lock bolt also comprises an operating section 17 which comprises a body of plate-like form adapted to fit slidably in the upper part of the lock casing and having a forwardly projecting central portion 18 received in a recess 19 in the upper part of the head section 12 and connected with the head section 12 by a vertical pivot element 20. The operating section 17 of the movable lock bolt also comprises a depending flange 21 at the rear end of the body of said operating section. A substantially V-shaped spring 22 has forwardly turned end portions 23 bearing against the inner wall of the back member 3 of the lock casing and has the middle portion thereof bearing against the flange 21 of the operating section of the moving lock bolt, the action of the spring being such as to tend to maintain the movable lock bolt in outshot position. The means for retracting the moving lock bolt into the casing against the action of the spring 22 comprises a tubular guard section 23 having a reduced end portion 24 rotatably supported in an opening 25 in one of the side walls 2 and having the opposite end portion thereof, indicated at 26, journaled in an opening 27 in the other side wall 2 of the lock casing, the openings 25 and 27 being in alignment transversely of the lock casing. An opening 28 in the side wall of the top section of the lock casing is in register with the opening 27 and has a radial notch 29 in its wall for a purpose to be presently described. A tubular eccentric or tumbler 30 is supported on the tubular guide 23 between the flange 21 of the operating section of the moving lock bolt and the rear wall of the head section of the moving lock bolt. The tumbler 30 has portions or flanges which are relatively large diametrically and which protrude into openings, such as indicated at 32, 33 and 34 respectively in the body of the operating section of the lock bolt, whereby the tumbler 30 is held against axial movement relatively to the operating section of the moving lock bolt on the guide member 23. The latter also has flanges which protrude into openings 35 and 36 in the body of the operating section of the movable lock bolt.

The tubular guide 23 and the tumbler 30 have aligned radial slots as indicated at 37 and 38, respectively, and when these slots 37 and 38 are in alignment with the body 29, the blade of a key 39 can be inserted in the aligned slots 37, 38, 29. The key when fully inserted in the aligned slots of the tubular guide 23 and the tumbler 30 can be manipulated to turn the tubular guide and the tumbler thereon from the position shown in Figures 3 and 4 in a clockwise direction until the tumbler shall have contacted with the depending flange 21 of the operating section of the moving latch bolt and shall have caused the moving lock bolt to be shifted rearwardly in the lock casing against the action of the spring 22. This will cause the head section of the moving lock bolt to move out of engagement with the tire valve stem 10 so that the latter can be shifted rearwardly between the arms of the shackle until the threads thereof no longer engage with the threads 9 of the bight portion of the shackle and the lock then can be displaced from position on the tire valve stem. However, when the tire valve stem is engaged by both the shackle 6 and the moving lock bolt, the latch cannot be displaced from position on the tire valve stem and when the lock has been applied to the portion of the tire valve stem that extends inwardly from the inner felly of a wheel 40, it is obvious that the tire 41 to which the tire valve stem is joined and which is mounted on the rim of the wheel cannot be removed from the wheel without serious injury to the tire.

It will be observed that the lower face of the top 4 and the upper face of the bottom 1 of the lock casing may be suitably recessed, as at 42 and 43, respectively to permit turning movement of the eccentric 30 about the axis of the tubular guide and support 23.

Obviously, my invention is susceptible of embodiment in forms other than that illustrated in the accompanying drawing and I therefore consider as my own all such modifications and adaptations thereof as fairly fall within the scope of the appended claims.

I claim:—

1. A lock comprising a casing, a lock bolt slidable to and from position to extend from an opening in the wall of a lock casing, said lock bolt having a flange at its inner end, a substantially tubular guide extending transversely of the casing forwardly of said flange, a tubular eccentric mounted on said tubular guide, said tubular guide and said eccentric having aligned radial slots for the reception of a portion of the blade of a key for turning said tubular guide and eccentric about the axis of the tubular guide, said eccentric being adapted to contact with the flange of said lock bolt to move said lock bolt rearwardly in the casing, and spring means acting on said flange of the lock bolt to urge said lock bolt outward, said tubular guide and said tubular eccentric having diametrically enlarged portions entering slots in said movable lock bolt for preventing longitudinal movement of said tubular guide and said tubular eccentric in said casing.

2. A lock having a casing comprising two cooperative sections, one of said sections comprising a bottom having upstanding side walls and an upstanding rear end wall, the other section comprising a top wall and a pair of depending side walls straddling the side walls of the first section, said sections being secured together, a shackle substantially of U-shape and having the arms thereof disposed within the lock casing and secured to the latter, and a lock bolt having a head portion movable between the arms of said shackle, said head portion of the lock bolt and the inner wall of the bight portion of the shackle having teeth on confronting portions thereof for engaging with the threads of a tire valve stem, said movable lock bolt also comprising an operating section pivotally attached to the head section and having a flange at its inner end, and a key-operable eccentric within the lock casing adapted to engage with the rearward end of the head section of the lock bolt to project the lock bolt to outshot position, said eccentric being adapted to engage with the flange of the operating section of the movable lock bolt to retract the movable lock bolt into the lock casing, and a spring within the lock casing engaging with said flange of the lock bolt and acting to urge said movable lock bolt outward.

3. A lock having a casing comprising two cooperative sections, one of said sections comprising a bottom having upstanding side walls and an upstanding rear end wall, the other section comprising a top wall and a pair of depending side walls straddling the side walls of the first section, said sections being secured together, a shackle substantially of U-shape and having the arms thereof disposed within the lock casing and secured to the latter, and a lock bolt having a head portion movable between the arms of said shackle, said head portion of the lock bolt and the inner wall of the bight portion of the shackle having teeth on confronting portions thereof for engaging with the threads of a tire valve stem, said movable lock bolt also comprising an operating section pivotally attached to the head section and having a flange at its inner end, and a key operable eccentric within the lock casing adapted to engage with the rearward end of the head section of the lock bolt to project the lock bolt to outshot position, said eccentric being adapted to engage with the flange of the operating section of the movable lock bolt to retract the movable lock bolt into the lock casing, and a spring within the lock casing engaging with said flange of the lock bolt and acting to urge said movable lock bolt outward, the arms of said shackle having stops for engaging with said head section of the movable lock bolt to limit the outward movement of the latter.

BELISARIO FIERRO.